US009812004B1

(12) United States Patent
Boshernitzan et al.

(10) Patent No.: US 9,812,004 B1
(45) Date of Patent: Nov. 7, 2017

(54) CONTROL SYSTEM FOR A TERMINAL DEVICE AND A SWITCH

(71) Applicant: Swan Solutions Inc., Houston, TX (US)

(72) Inventors: Yaniv Boshernitzan, Houston, TX (US); Ohad Nezer, Houston, TX (US)

(73) Assignee: SWAN SOLUTIONS, INC., Austin, TX (US)

( * ) Notice: Subject to any disclaimer, the term of this patent is extended or adjusted under 35 U.S.C. 154(b) by 0 days.

(21) Appl. No.: 15/461,186

(22) Filed: Mar. 16, 2017

(51) Int. Cl.
*G08C 17/02* (2006.01)
*G06F 3/01* (2006.01)

(52) U.S. Cl.
CPC ............. *G08C 17/02* (2013.01); *G06F 3/017* (2013.01); *G08C 2201/30* (2013.01)

(58) Field of Classification Search
CPC ...... G08C 17/02; G08C 2201/30; G06F 3/017
USPC ...................................... 340/12.55
See application file for complete search history.

(56) References Cited

U.S. PATENT DOCUMENTS 5,971,761 A   10/1999  Tillman, Sr.
8,228,315 B1   7/2012  Starner et al.
8,788,978 B2   7/2014  Stedman et al.
9,130,651 B2 *  9/2015  Tabe ................. H04B 1/3838
2010/0019922 A1   1/2010  Van Loenen et al.
2012/0249416 A1  10/2012  Maciocci et al.
2013/0321346 A1  12/2013  Tyler et al.
2014/0111483 A1   4/2014  Harrison et al.
2014/0225824 A1   8/2014  Shpunt et al.

FOREIGN PATENT DOCUMENTS

WO           2013165348           11/2013

* cited by examiner

*Primary Examiner* — Allen T Cao
(74) *Attorney, Agent, or Firm* — Andrew W. Chu; Craft Chu PLLC

(57) ABSTRACT

The control system for a terminal device and a switch can be operated by gestures and incorporate existing infrastructure. The control system includes the wall, wiring, electricity source to the wall, the switch with a control module, and the terminal device connected to the switch. The system also includes a housing and a sensor within the housing. The control module receives gesture data from the sensor to actuate the switch corresponding to desired activity of the terminal device. The range of activities of the terminal device corresponds to the different modes of the switch. The system can retrofit a terminal device and a switch in an existing installation so that the terminal device can be controlled by gestures. The control system can also have power source based on the existing infrastructure or a battery.

20 Claims, 6 Drawing Sheets

CONTROL SYSTEM FOR A TERMINAL DEVICE AND A SWITCH

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a control system for a terminal device with a switch, such as a ceiling fan or lighting fixture. More particularly, the present invention relates to controlling a terminal device connected to a wall or ceiling by gestures. Additionally, the present invention relates to using gestures to control a terminal device operated by a switch and managing power consumption of the control system.

2. Description of Related Art Including Information Disclosed Under 37 CFR 1.97 and 37 CFR 1.98

With the development of electronic technology, output devices or terminal devices are used daily and are increasingly integrated with interactive features in order to enhance convenience and functionality. Users now can use a control system or controller, such as a remote control device, to adjust lights, curtains, a thermostat etc. Existing control systems include distinct remote control devices dedicated to and associated with the particular output or terminal device to be controlled. Remote control devices can also be associated with more than one terminal device, such as a master controller for electronics and a touchscreen computer tablet made integral with furniture or walls to control lighting and room temperature. Any computer with an interface (keyboard, mouse, touch pad or touchscreen) can be a remote control device for multiple terminal devices with smart technology. Mobile phones are also known to be enabled for controlling terminal devices, such as home security cameras and door locks. Another existing control system involves voice recognition technology.

Existing control systems have limitations. Each output or terminal device typically is associated with a respective remote control device, such as a controller for the cable box, a controller for the DVD player, and a controller for the sound mixer. An excessive number of controllers is needed in order to remotely control multiple devices. Furthermore, an individual controller is often misplaced or left in locations that are not readily accessible to the user. The user must search for a controller or change locations to access the controller. Additionally, voice recognition technology often requires cumbersome training sessions to calibrate for pronunciations and accents of each particular user. Furthermore, voice recognition technology is often impaired by background noise resulting in difficulties for that control system to recognize verbal commands. Additionally, the sound produced by voice commands may be obtrusive in many environments such as in a room where others are sleeping, or in a room while watching a movie.

For remote control devices associated with multiple terminal devices, for example, computer tablets with a touchscreen and computers with touchpads, remote control devices can be built into or integrated into furniture. Smart tables have been built with touchscreens that are able to receive touch-based gestures. In the case of integrating these touchscreen or touch pads into surfaces of structures such as furniture, the cost of the structure is significantly increased due to design modifications required to accommodate the remote control device, and the cost of the components and hardware. Furthermore, aesthetics are often affected. Appearances are altered when furniture, walls and surroundings are filled with touchscreens, touchpads, and other conspicuous devices. Integration of such hardware into furniture also requires the manufacturer to modify existing designs such that the hardware can be accommodated into the structure.

Prior art manual control systems range from buttons on a television remote controller to a touchscreen of a mobile phone. Simple gestures of pressing dedicated buttons and complex gestures of finger motions on a touchscreen are both used to control terminal devices. Various patents and publications are available in the field of these manual control systems.

U.S. Pat. No. 8,788,978, issued to Stedman et al on Jul. 22, 2014, teaches a gesture sensitive interface for a computer. The "pinch zoom" functionality is the subject matter, so that the detection of first and second interaction points, and the relative motion between the points are detected by sensors. A variety of sensors are disclosed to define the field, including a touch screen, camera, motion sensor, and proximity sensors.

World Intellectual Property Organization Publication No. WO2013165348, published for Bess on Nov. 7, 2013, describes a system with at least three accelerometers disposed in different locations of an area with a surface to capture respective vibration data corresponding to a command tapped onto the surface by a user. A processing system receives the vibration data from each accelerometer, identifying the command and a location of the user from the vibration data. A control signal based on the command and the location is generated.

U.S. Patent Publication No. 20140225824, published for Shpunt et al on Aug. 14, 2014, discloses flexible room controls. A control apparatus includes a projector for directing first light toward a scene that includes a hand of a user in proximity to a wall of a room and to receive the first light that is reflected from the scene, and to direct second light toward the wall so as to project an image of a control device onto the wall. A processor detects hand motions within the projected field.

U.S. Patent Publication No. 20120249416, published for Maciocci et al on Oct. 4, 2012, describes another projection system with gesture identification. The projector is a unit worn on the body of the user to project onto surfaces, such as walls and tables. Spatial data is detected by a sensor array. Additional rendering operations may include tracking movements of the recognized body parts, applying a detection algorithm to the tracked movements to detect a predetermined gesture, applying a command corresponding to the detected predetermined gesture, and updating the projected images in response to the applied command.

U.S. Patent Publication No. 20100019922, published for Van Loenen on Jan. 28, 2010, is the known prior art for an interactive surface by tapping. Sound detection is filtered and interpreted either in the system to be controlled or else in the sensors themselves. The direction of movement of a hand stroking the surface can be interpreted as a command to increase or decrease a parameter, such as the sound volume level of a television, for example. Determination of the position of the user's hand is unnecessary.

In other innovative systems, a control system can convert any independent mounting surface into a controller for a terminal device. A physically separate mounting surface, such as a wall or table surface, can be used to activate and deactivate a television or light fixtures, without the user touching either appliance. The control system includes a housing engaged to a mounting surface, a sensor and microcontroller unit within the housing, a server in communication with the sensor, and a terminal device in communication with the server. The terminal device is to be controlled by gestures associated with the mounting surface. The control system further includes a server in communication with the sensor, including but not limited to wifi, Bluetooth, local area network, wired or other wireless connection. The terminal device can be an appliance, lighting fixture or climate regulator.

For a terminal device with a switch, the control of the terminal device can be very simple, such as a light switch or ceiling fan. There are only two commands: "on" and "off", or possibly another discrete number of commands for dimming levels or three fan speeds. These terminal devices with a switch are also typically connected to a wall or ceiling. In existing systems with terminal devices with switches, a light switch is in the wall with a wired connection to the light fixture on the ceiling. There is existing infrastructure for these terminal devices with switches, such as hard wiring, direct electrical connections to power, and junction boxes or electrical boxes. The switch has a control module to toggle between "off" and "on". The prior art control systems over-engineer solutions to control these types of terminal devices, wherein a wireless network, complex controls, and a server are used to flip a light switch. There is a need for a control system to utilize existing infrastructure of terminal devices with switches for efficiency and power regulation. There is not always a need for the technology and components of advanced control systems for terminal devices with switches, and there are available power sources and electrical connection without the need for Bluetooth or other wireless communication.

It is an object of the present invention to provide a system and method for controlling a terminal device with a switch.

It is an object of the present invention to provide a system and method to control a terminal device with a switch by gestures, including but not limited to knocks.

It is another object of the present invention to provide a system and method to be incorporated into existing infrastructure.

It is still another object of the present invention to provide a system and method to efficiently utilizing existing components in an installation.

It is still another object of the present invention to provide a system and method to retrofit terminal devices with switches for control by gestures, including but not limited to knocks.

It is another object of the present invention to provide a system and method with regulated power consumption.

It is still another object of the present invention to provide a system and method to regulate power consumption by incorporating infrastructure of an installation.

It is still another object of the present invention to provide a system and method to regulate power consumption by reducing reliance on battery power of the system.

These and other objectives and advantages of the present invention will become apparent from a reading of the attached specification.

BRIEF SUMMARY OF THE INVENTION

Embodiments of the present invention disclose a control system for a terminal device and a switch. The existing installation of the terminal device includes a panel with a junction box and an electrical connection, and a switch with a control module. The panel can be a wall or other structural element in building construction. Instead of a mechanical lever or dial to actuate the switch, the present invention has a housing and a sensor in the housing. The housing attaches to a mounting surface on either side of the panel. There is an attachment means to reduce damping of the sensor. The sensor forms an interactive zone aligned with the mounting surface and is fixed in position relative to the housing. The sensor is connected to the control module of the switch.

A contact interaction associated with the mounting surface is detected by the sensor as data signals. A contact interaction is a gesture by the user, such as a knock on the front side of a wall with the housing attached to the back side of the wall. The data signals, as vibration data or sound data or both, are detected by the sensor and received by the control module of the switch. The control module determines a switch data pattern based on the data signals and matches the switch data pattern to a switch gesture profile. Each switch gesture profile is associated with each mode of operation of the switch. The control module generates the command to actuate the switch according to the switch gesture profile matched by the switch data pattern. Additional embodiments include a plurality of terminal devices connected to the switch, such that the actuation of the switch controls activity of more than one terminal device.

In some embodiments, there is a wired connection between the sensor and the control module, so that the sensor and control module can be powered by the electrical connection in the existing installation or a battery in the housing. The housing is on the back side of the panel, while the user gestures against the front side of the panel. Alternatively, there is a wireless connection between the control module of the switch and the sensor. The electrical connection of the existing installation powers the switch, and a battery in the housing powers the sensor. The housing is on the front side of the panel, while the junction box is on the back side of the panel. The user gestures against the front side of the panel.

The control system of the retrofit switch and terminal device remains compatible with advanced components. The control system can include a server in communication with the sensor and at least another terminal device in communication with the server. The contact interaction can be detected by the sensor and a data pattern can be matched to a gesture profile in the server for controlling activity of that other terminal device. The control system can actuate the switch for the terminal device of the existing installation and other terminal devices in a wireless connection to the server and sensor. The control system of this embodiment remains connected to the junction box, so hard wiring can still power the control system, even for the other terminal devices not connected to the panel. When the embodiment connects to the server for controlling other terminal devices, the control module can also switch between a slack mode and an active mode. In addition to actuating the switch for the terminal device connected to the panel or wall, the system actuates the control module to connect and disconnect the sensor to the server.

DETAILED DESCRIPTION OF THE INVENTION

Building structures have existing walls, fixtures, and mechanical switches for the fixtures. The fixtures can be lights or ceiling fans or other appliances. The mechanical switches can be levers or dials for setting "on" and "off" or various levels of light intensities and fan speeds, according to the fixture. This infrastructure supports simple switches directly connected to the fixtures through the walls and ceiling. The mechanical switches have limitations, especially for those users with different physical abilities. The strength, coordination, and placement of the mechanical switch at a height on the wall restrict the ability for many users with special needs or less physical ability. One solution has been replacing the mechanical switch with a control system by gestures. These control system by gestures can be used to actuate a light switch or change the channel on the television or lower temperature on a thermostat. However, for particular terminal devices having simple modes of operation and being already installed on infrastructure, the control system by gestures can be adapted to accommodate these physical conditions and to facilitate power regulation of the control system.

Figure 1:
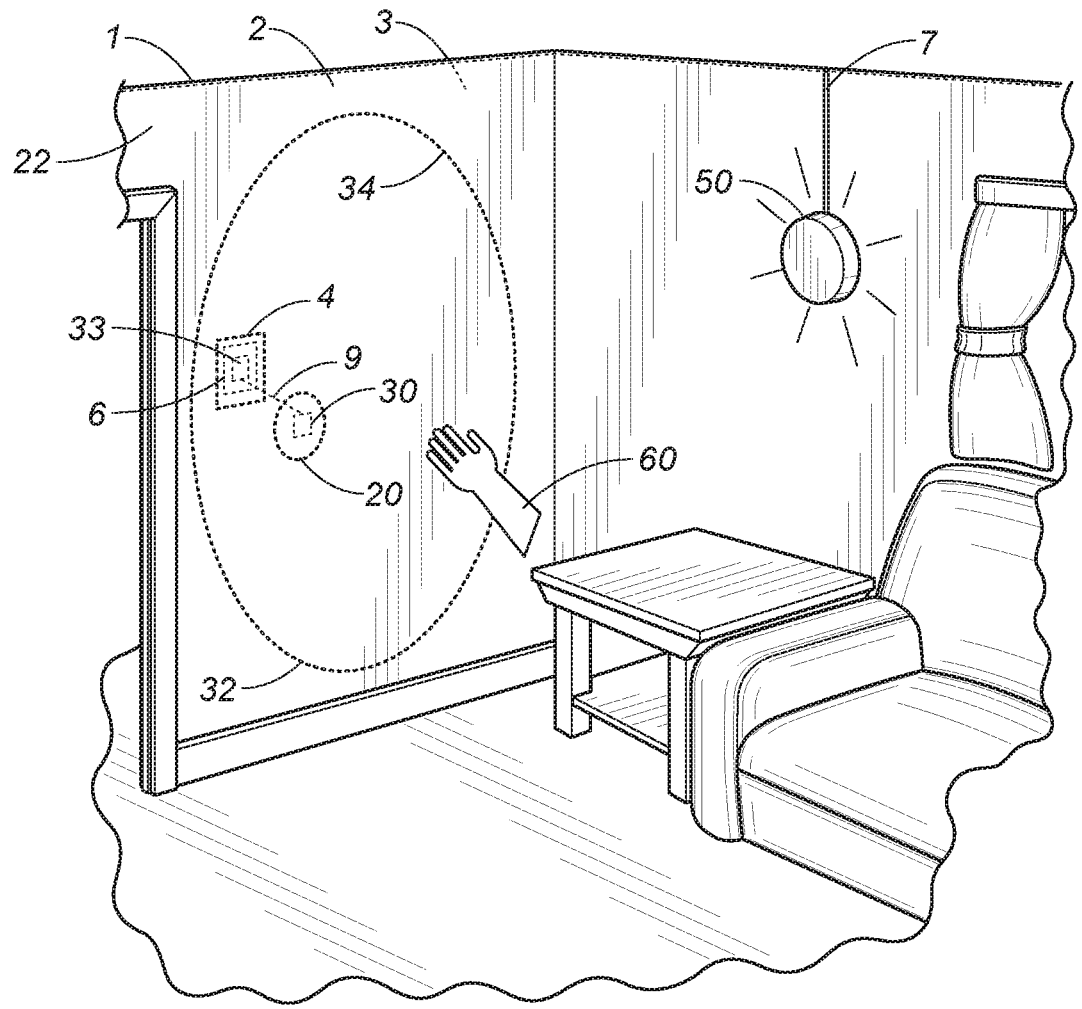
FIG. 1 is a perspective view of an embodiment of the present invention, showing a control system with a terminal device and a switch in an existing installation for contact interactions of the front side of the panel.
Figure 2:
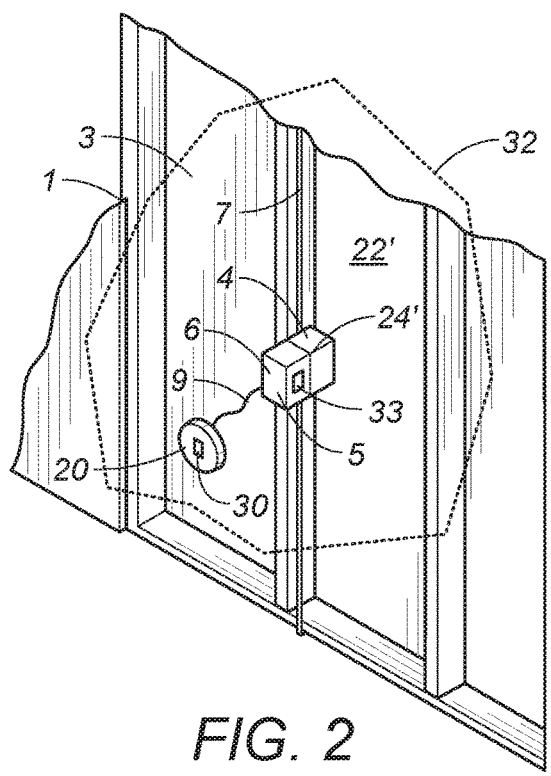
FIG. 2 is a perspective view of an embodiment of the existing installation of FIG. 1 with the junction box, housing, and sensor on the back side of the panel or wall.
Figure 3:
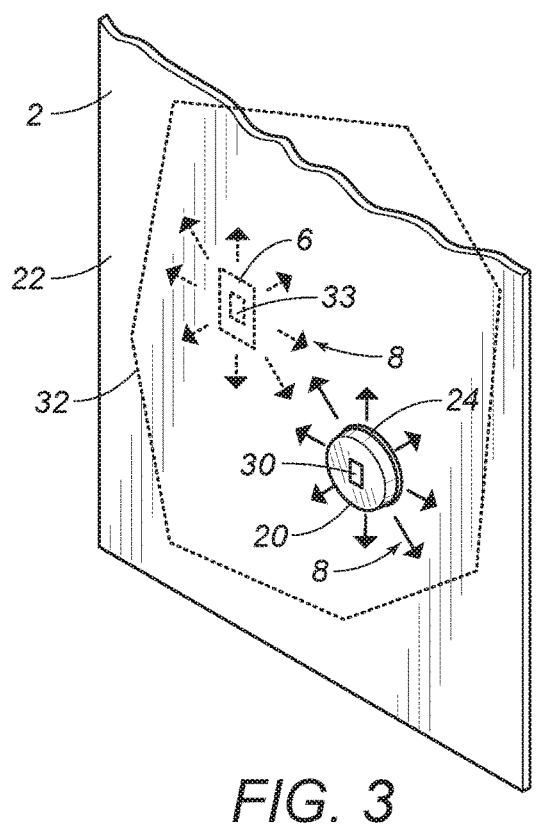
FIG. 3 is a perspective view of an embodiment of the existing installation of FIG. 1 with the housing and sensor on the front side of the panel or wall and wireless connection between the sensor and the control module of the switch.

Referring to FIGS. 1-6, embodiments of the control system 10 include a panel 1 having a front side 2 and a back side 3, which can be existing infrastructure. The panel 1 can be comprised of a junction box 4 and an electrical connection 5 with access through the junction box 4. FIGS. 2 and 3 show a switch 6 with a control module 33. The switch 6 has limited modes of operation and can also be contained in the junction box 4. The terminal device 50 connects to the switch 6 by wire 7 in FIG. 2. Each mode of operation of the switch 6 corresponds to a respective activity of the terminal device 50. The junction box 4 is mounted on the back side 3. The access to the junction box 4 can be on the front side 2, as in FIG. 3 or on the back side 3, as in FIGS. 1-2. FIG. 1 shows the junction box 4 in broken lines to indicate placement on the back side of the panel 1 as a wall with the control module 33 of the existing switch 6 on the backside as well. The sensor 30 in the housing 20 is also shown in broken lines to indicate placement on the backside of the panel or behind the wall.

There is a housing 20 comprised of an engagement means 24 for a mounting surface 22, and the mounting surface 22 is on the panel 1. When the housing 20 is on the back side 3, the mounting surface 22 is on the back side 3. When the housing 20 is on the front side 2, the mounting surface 22 is on the front side 2. The sensor 30 is contained in the housing 20 and connected to the control module 33 of the switch 6. The control module 33 of the switch 6 may require modifications to communicate with the sensor 30 instead of a mechanical lever or dial. The control module 33 may include modifications to an existing printed circuit board or other microcontroller or an added printed circuit board or microcontroller to facilitate communication of the sensor 30 with the existing infrastructure. There is a rigid positioning of the sensor 30 relative to the mounting surface 22 through the housing 20. Any sound or vibration or both of the mounting surface 22 is transmitted to the sensor 30. The engagement means 24 attaches sensor 30 and reduces damping so that the sensor 30 more accurately detect contact interactions 60 through the mounting surface 22.

Figure 4:
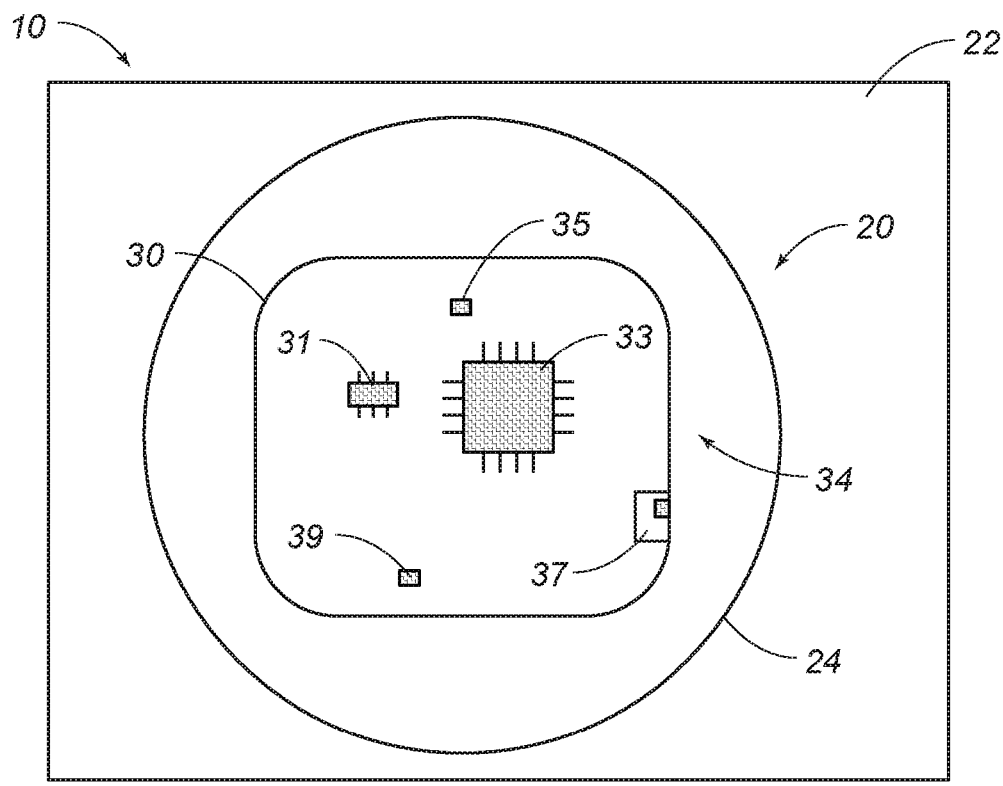
FIG. 4 is a schematic view of an embodiment of the control system of the present invention with the sensor on the mounting surface.

The control system 10 of the present invention includes a sensor 30 as shown in FIG. 4. The housing 20 contains the sensor 30 comprised of a circuit board 34 with a flash memory 31, the sensor unit 35, antenna 37, and light emitting diode 39. The sensor unit 35 can be an accelerometer or an acoustic sensor or combination of both. Some embodiments of the antenna 37 can have wifi capability for communication with a server 40 (See embodiment of FIGS. 7-8). The sensor 30 may also have a microcontroller unit (not shown). The control module 33 is connected to the sensor unit 35 and can also have wireless capability for communication with the server 40 through the sensor 30. The rigid position of the sensor 30 establishes the transmission of the contact interaction 60 to the sensor unit 35. The engagement means 24 is in a fixed position relative to the sensor 30. Other parts in the housing 20 can include batteries 36 as a known power supply for the control system 10 as in FIG. 5. The batteries 36 power the sensor 30. The stable construction of the housing 20 and the sensor 30 enable the accurate and efficient conversion of the contact interactions 60 as gestures into commands for a terminal device 50.

In this embodiment of the control system 10, FIG. 1 shows the sensor 30 forming an interactive zone 32 defined by a range 34 of the sensor 30. A contact interaction 60 with the mounting surface 22 within the accelerometer interactive zone 32 is detected by the sensor 30 as data signals 70. FIG. 1 shows the interactive zone 32 aligned with the mounting surface 22, in particular, the interactive zone 32 is coplanar with the mounting surface 22. The contact interaction 60 on the mounting surface 22 can be detected by the sensor 30 on the mounting surface 22.

The interactive zone 32 of the sensor 30 aligns with the mounting surface 22. FIGS. 1 and 2 show the interactive zone 32 overlaying the mounting surface 22 with the mounting surface 22 on the back side 3 of the panel 1. The contact interaction 60 will be on the front side 2 of the panel 1. When hidden on the back side 3, the front side 2 is clear for aesthetic purposes and allows for a direct wire connection 9 between the sensor 30 in the housing 20 and control module 33 of the switch 6 in the junction box 4. In this embodiment, the sensor 30 and the control module 33 can be connected to the electrical power source 5 and the switch 6. The power source of the infrastructure can be connected to the system 10 to power the sensor 30 and control module 33. The access to batteries 36 (See FIG. 4) is limited because the housing 20 is behind the panel 1 as a wall. The need to change batteries 36 is eliminated since the system 10 can be powered by the electrical connection 5 of the infrastructure.

Figure 5:
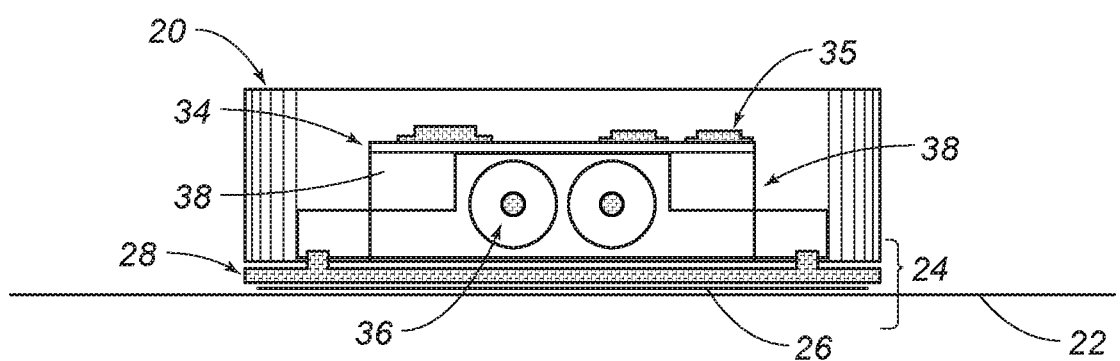
FIG. 5 is a side elevation view of the embodiment of the housing and sensor of FIG. 4.

FIGS. 1 and 3 show the interactive zone 32 of the sensor 30 co-planar with the mounting surface 22 with both the mounting surface 22 and housing 20 on the front side 2 of the panel 1. The contact interaction 60 is also the front side 2 of the panel 1. In the coplanar relationship, the direct wiring to the infrastructure is no longer possible, when the front side 2 of the panel 1 covers the junction box 4. These embodiments include a wireless connection 8 between the control module 33 of the switch 6 and the sensor 30. FIGS. 3 and 5 show a battery 36 contained within the housing 20 and connected to the sensor 30. The battery 36 powers the sensor 30 only so access to the housing 2 for new batteries is required. With the mounting surface 22 on the front side 2, the housing 2 is accessible.

FIG. 5 shows the engagement means 24 of the housing 20 as cooperative with the sensor 30 so that any contact interaction 60 generates data signals 70 of the sensor 30 through the transmission portion 28 of the engagement means 24. There is less damping of the contact interaction as sound or vibration. The transmission portion 28 can have less damping than the mounting surface 22 or the actual surface of the knocking in the interactive zone 32. In some embodiments, the transmission portion 28 affects transmission of the data signal to the sensor 30. The rigid position of the sensor 30 relative to the mounting surface 22 reduces damping of the contact interaction through the transmission portion 28. The transmission portion 28 can be comprised of a rigid material, such an injection molded frame with flexibility different than the materials of the mounting surface 22 or surface of the contact interaction, if different from the mounting surface 22. In the embodiment with the spring loaded portion (not shown), the spring loaded portion of the transmission portion 28 has less damping than the mounting surface 22 or surface of the contact interaction, if not the same. Sound or vibration has less damping through a spring loaded portion for the transmission of the contact interaction through the transmission portion 28 to the sensor 30. For example, the spring loaded portion as the transmission portion 28 may hold the housing 20 closer and stronger to the mounting surface 22 so as to reduce damping sound or vibration of contact interaction. In the embodiment with adhesive, the transmission portion 28 has damping according to the stability of the attachment of the sensor 30 to the mounting surface 22.

Figure 6:
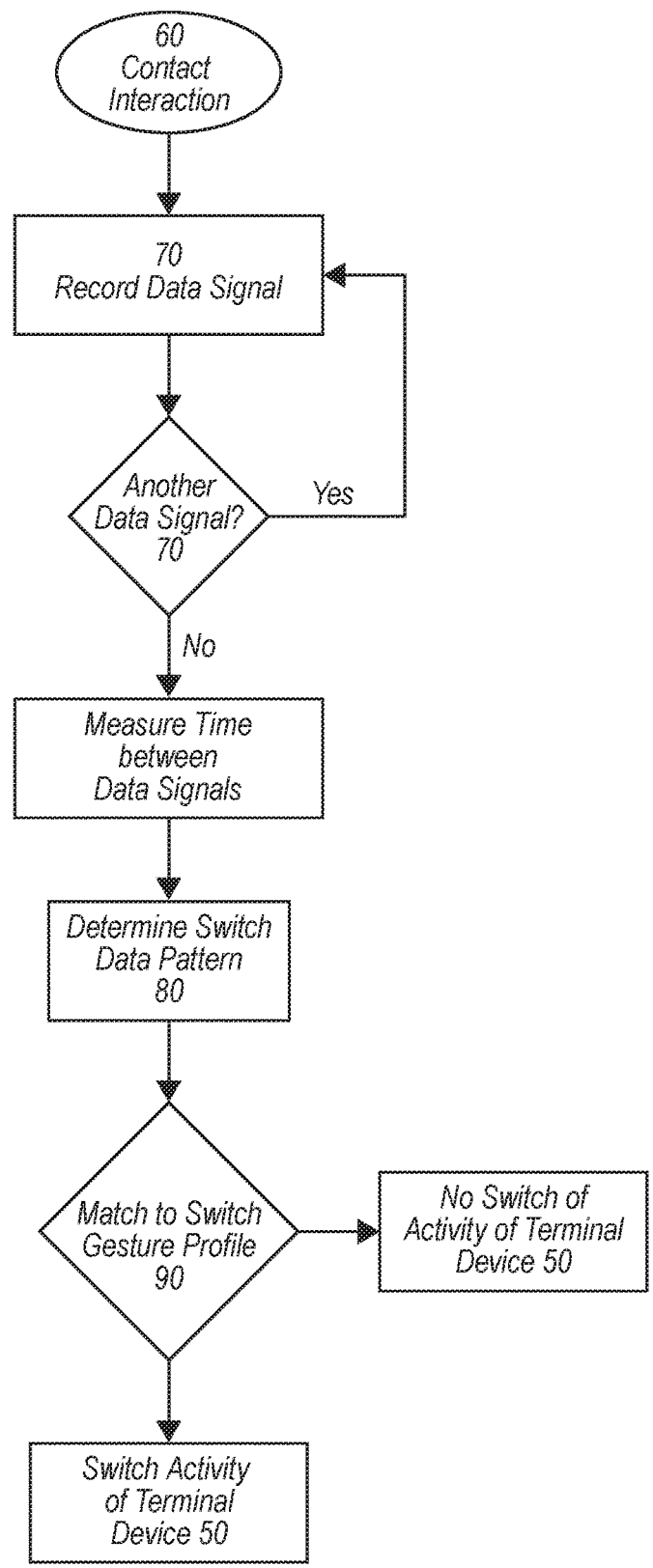
FIG. 6 is a flow diagram of the embodiment of the system and method for controlling a terminal device by actuating the switch according to gestures.

According to FIG. 6, the embodiments of the control module 33 of the switch 6 connect to the sensor 30 and receive the data signals 70 from the sensor 30. The control module 33 determines a switch data pattern 80 corresponding to the data signals 70 of the contact interaction 60. The control module 33 matches the switch data pattern 80 with a switch gesture profile 90. Each switch gesture profile 90 is associated with each mode of operation of the switch 6, such as two knocks for "on" and three knocks for "off". In the present invention, the control module 33 actuates the switch 6 according to the switch gesture profile 90. As the sensor 30 detects contact interactions 60, the control module 33 toggles between each mode of operation of the switch 6. Therefore, the terminal device 50 changes activity, when the switch data pattern 80 matches a respective switch gesture profile 90.

Figure 7:
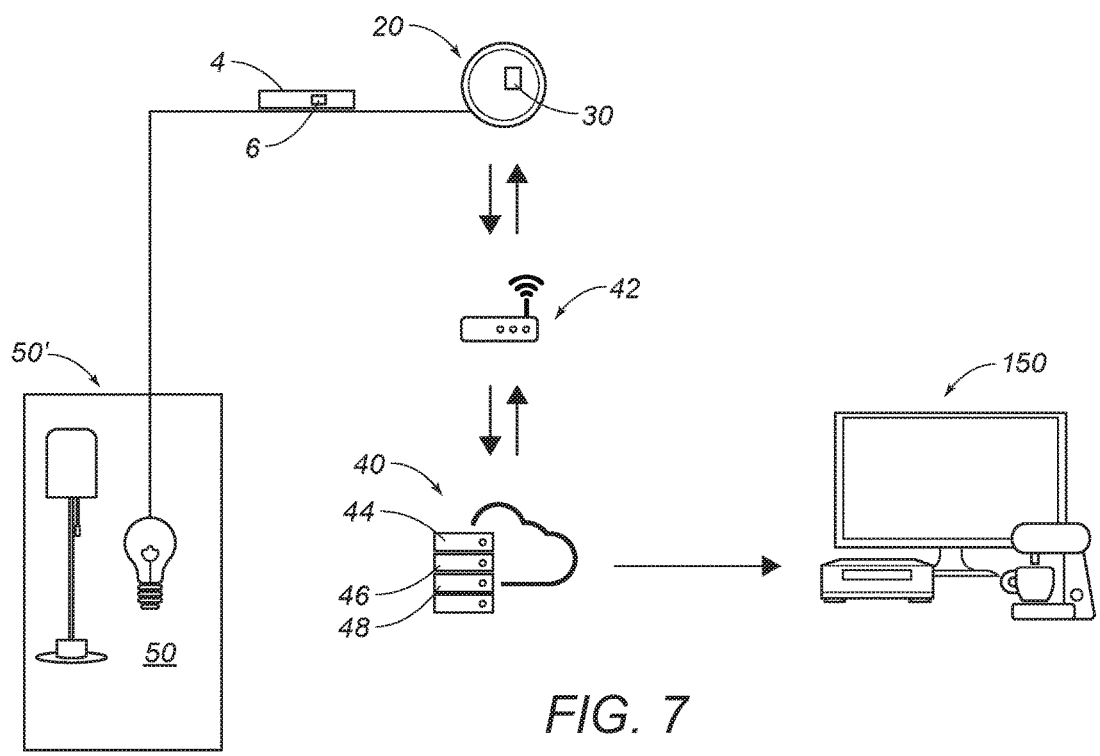
FIG. 7 is a flow diagram of another embodiment of the control system connected to a server and other terminal devices, in addition to the terminal device and the switch.

In other embodiments, there are a plurality of switches connected to a control module and a respective plurality of terminal devices for each switch. For example, a ceiling fan and an overhead light are controlled by existing wall switches. In the embodiment with a switch for each terminal device, the sensor connects to the control module for the plurality of switches. The control module receives the data signals from the sensor and determines a switch data pattern. The switch data pattern matches a switch gesture profile for any mode of operation of any terminal device connected to the switch. In the example of the ceiling fan and overhead light, one knock can activate the overhead light, two knocks can deactivate the overhead light, three knocks can active the ceiling fan, and four knocks can deactivate the ceiling fan. The embodiments with more than one switch and respective terminal devices can incorporate the existing switch with the existing control module. More than one terminal device can be controlled by the present invention incorporated into the existing infrastructure. In another alternative embodiment shown in FIG. 7, there is a plurality of terminal devices 50, 50' connected to a corresponding switch 6 through a server 40. The embodiment of FIG. 7 is a more complex version of more than one switch and respective terminal devices because there is a server to connect. The switch data pattern 80 can match a switch gesture profile 90, when the switch gesture profiles 90 correspond to different terminal devices 50, 50' connected to the switch 6. Each terminal device 50, 50' has an activity corresponding to a mode of operation of the switch 6.

Figure 8:
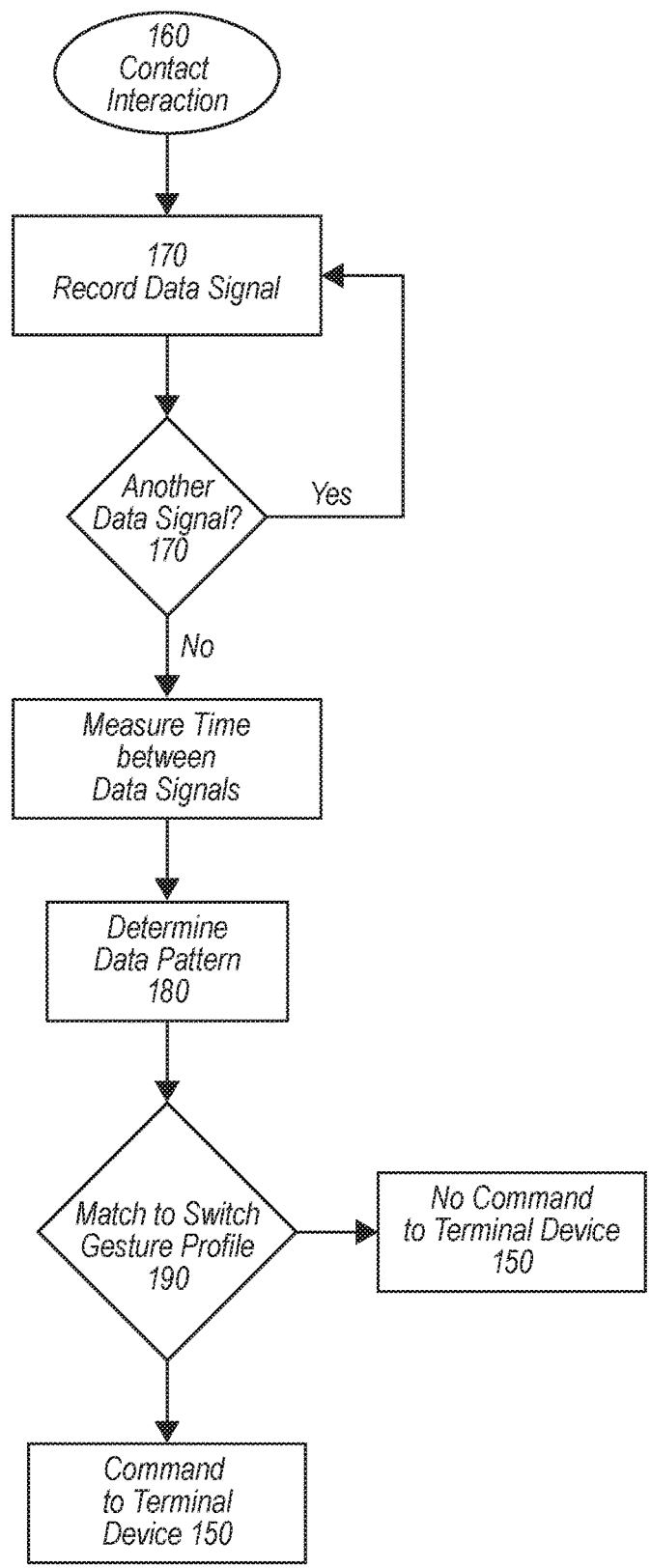
FIG. 8 is a flow diagram of the embodiment of the system and method for controlling other terminal devices through a server according to gestures concurrent with the existing infrastructure.

The other alternative embodiment of FIGS. 7 and 8 shows the control system 10 including a server 40 in communication with the sensor 30, control module 33, and additional terminal devices 150. The communication can be wireless or wired. The connection between the server 40 and the sensor 30 can include a router 42, as shown in FIG. 7, and may also include wifi, Bluetooth, local area network, or other connections. In FIG. 7, the server 40 can be comprised of a routing module 44, a processing module 46 being connected to the routing module 44, and an output module 48 connected to the processing module 46. According to FIG. 8, the control module 33 receives the data signals 170 from the sensor 30. These data signals 170 correspond to the contact interaction 160 associated with the mounting surface 22 for the terminal devices 150. The control module 33 determines the data pattern 180 corresponding to the data signals 170 of the contact interaction 160.

The routing module 44 receives the data pattern 180, and the processing module 46 matches the data pattern 180 with a gesture profile 190. The gesture profile 190 is associated with a command, such as power off or change channels or dim intensity. Then, the output module 48 transmits the command to the terminal device 150. Each terminal device 150 can be comprised of a receiving module and means for initiating activity corresponding to the command. The other terminal devices 150 are in communication with the server 40 with the output module 48 transmitting the command to the receiving module.

For example, when the terminal device 150 is a television, a contact interaction 160 of two knocks can be detected as data signals 170 to generate a data pattern 180. The data pattern 180 can be matched to a gesture profile 190 on the server 40 associated with changing channels up one channel. The output module 48 communicates the command to change channels up one channel through the server 40 to the television as the terminal device 150. An elderly person in a wheelchair is able to change channels by knocking twice on a tabletop instead of locating a dedicated button on the television or fiddling with a touchscreen on a smartphone.

In this embodiment, the complex controls are compatible with the existing infrastructure and concurrent with the simple terminal device 50 actuated by switch 6 with a control module 33. The complexity of the gesture profiles 190 stored on the server 40 can be compatible with the switch gesture profiles 90 of the control module 33. In particular, when the interactive zone 32 of the sensor 30 aligns with the mounting surface 22 with the interactive zone 32 overlaying the mounting surface 22, the mounting surface 22 is on the back side 3 of the panel 1, and the contact interaction 160 will be on the front side 2 of the panel 1. The electrical connection 5 in the junction box 4 can continue to power the sensor 30 and the control module 33 of the switch 6, in addition to the antenna 37 for connection to the server 40. The direct electrical power source can support the system 10, so that existing infrastructure is accommodated by the complex controls and the original switch.

In still another embodiment, according to FIGS. 7-8, the control module 33 can have a first power consumption level so as to be in a slack mode and a second power consumption level so as to be in an active mode. The second power consumption level is higher than the first power consumption level. The control module 33 receives the data signals 70 from the sensor 30 and determines a mode data pattern, analogous to the switch data pattern 80, corresponding to the data signals of the contact interaction 60. In this embodiment, the control module 33 matches the mode data pattern with a mode gesture profile, analogous to the switch gesture profile 90. The mode gesture profile is associated with a command to switch the control module 33 from the slack mode to the active mode. The slack mode corresponds to the control module 33 only receiving the data signals 70 for the switch data patterns 80 for the simple terminal device 50 at the first power consumption level. The active mode corresponds to the control module 33 in the second power consumption level for connecting to the server 40, enabling the complex controls of other terminal device 150. With this embodiment, the user can shut down the complex controls by switching the control module 33 to slack mode.

The present invention provides a system and method for controlling a terminal device with a switch in existing infrastructure. The walls, wiring, junction box, switch with a control module, and electrical connections of a building structure can be incorporated into a control system by gestures, including but not limited to knocks. The control system is retrofit into existing components in an installation in a room. The control system accommodates a simple terminal device and the existing switch for control by gestures. The sensor relates to the control module of the switch and panel of infrastructure to utilize the existing wires and electrical connections. The control module of the existing switch may require some modification or additionals to communicate with the sensor. Any simple terminal devices controlled by the switch can be retrofit into the system, and there are variations to enable the complex controls through a server and other terminal devices. These complex controls remain concurrent with the walls, wiring, junction box, and electrical connections of a building structure. Furthermore, the system and method has regulated power consumption to account for the existing electrical connections. The infrastructure can be incorporated into the installation so that the reliance on battery power is reduced. Depending upon the placement of the housing and junction box, the system can incorporate existing infrastructure to improve energy efficiency without losing functionality of the original simple terminal device and switch.

As described herein, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

The foregoing disclosure and description of the invention is illustrative and explanatory thereof. Various changes in the details of the illustrated structures, construction and method can be made without departing from the true spirit of the invention.

We claim:

1. A control system comprising:
    a panel having a front side and a back side, said panel being comprised of a junction box and an electrical connection within said junction box;
    a switch having modes of operation and being contained in said junction box and connected to said electrical connection, wherein said switch is comprised of a control module for said modes of operation;
    a terminal device connected to said switch, wherein each mode of operation of said switch corresponds to a respective activity of said terminal device;
    a housing having an engagement means for a mounting surface, said mounting surface being on said panel;
    a sensor contained within said housing, said sensor forming an interactive zone defined by a range of said sensor, said interactive zone being aligned with said mounting surface, said sensor being in a fixed position relative to said engagement means, wherein a contact interaction associated with said mounting surface within said interactive zone is detected by said sensor as data signals, said sensor being in communication with said control module of said switch; and
    a power source connected to said sensor,
    wherein said control module receives said data signals from said sensor and determines a switch data pattern corresponding to said data signals of said contact interaction,
    wherein said control module matches said switch data pattern with a switch gesture profile, said switch gesture profile being associated with each mode of operation of said switch, and
    wherein said control module actuates said switch according to said switch gesture profile, said control module toggling between each mode of operation of said switch, according to a respective switch gesture profile.

2. The control system, according to claim 1, wherein said interactive zone of said sensor aligns with said mounting surface, said interactive zone overlaying said mounting surface, said mounting surface being on said back side of said panel, said contact interaction being on said front side of said panel.

3. The control system, according to claim 2, further comprising:
a wire connection between said sensor and said control module of said switch, wherein said power source of said sensor is comprised of said wire connection and said electrical connection.

4. The control system, according to claim 1, wherein said interactive zone of said sensor aligns with said mounting surface, said interactive zone being co-planar with said mounting surface, said mounting surface being on said front side of said panel, said contact interaction being on said front side of said panel.

5. The control system, according to claim 4, further comprising:
a wireless connection between said sensor and said control module of said switch, wherein said power source is comprised of a battery contained within said housing and connected to said sensor.

6. The control system, according to claim 4, wherein said front side of said panel covers said junction box and said electrical connection.

7. The control system, according to claim 1, wherein said engagement means of said housing comprises:
an attachment means between said housing to said mounting surface and a transmission portion connecting said sensor, said contact interaction generating said data signals of said sensor through said transmission portion.

8. The control system, according to claim 7, wherein said transmission portion is comprised of a spring loaded portion so as to reduce damping of said contact interaction.

9. The control system, according to claim 7, wherein said transmission portion is comprised of an adhesive so as to reduce damping of said contact interaction.

10. A control system comprising:
a panel having a front side and a back side, said panel being comprised of a junction box and an electrical connection within said junction box;
a plurality of switches, each switch having modes of operation and being contained in said junction box and connected to said electrical connection;
a control module connected to said plurality of switches;
a plurality of terminal devices, each terminal device being connected to a corresponding switch, wherein each mode of operation of a respective switch corresponds to an associated activity of a respective terminal device;
a housing having an engagement means for a mounting surface, said mounting surface being on said panel;
a sensor contained within said housing, said sensor forming an interactive zone defined by a range of said sensor, said interactive zone being aligned with said mounting surface, said sensor being in a fixed position relative to said engagement means, wherein a contact interaction associated with said mounting surface within said interactive zone is detected by said sensor as data signals, said sensor being in communication with said control module; and
a power source connected to said sensor,
wherein said control module receives said data signals from said sensor and determines a switch data pattern corresponding to said data signals of said contact interaction,
wherein said control module matches said switch data pattern with a switch gesture profile, said switch gesture profile being associated with each mode of operation of each switch, and
wherein said control module actuates each switch according to said switch gesture profile, said control module toggling between each mode of operation of a respective switch, according to a respective switch gesture profile.

11. The control system, according to claim 10, wherein said interactive zone of said sensor aligns with said mounting surface, said interactive zone overlaying said mounting surface, said mounting surface being on said back side of said panel, said contact interaction being on said front side of said panel.

12. The control system, according to claim 11, further comprising:
a wire connection between said sensor and said control module of said switch, wherein said power source of said sensor is comprised of said wire connection and said electrical connection.

13. The control system, according to claim 10, wherein said interactive zone of said sensor aligns with said mounting surface, said interactive zone being co-planar with said mounting surface, said mounting surface being on said front side of said panel, said contact interaction being on said front side of said panel.

14. The control system, according to claim 13, further comprising:
a wireless connection between said sensor and said control module of said switch, wherein said power source is comprised of a battery contained within said housing and connected to said sensor.

15. The control system, according to claim 10, wherein said engagement means of said housing comprises:
an attachment means between said housing to said mounting surface and a transmission portion connecting said sensor, said contact interaction generating said data signals of said sensor through said transmission portion.

16. The control system, according to claim 15, wherein said transmission portion is comprised of a spring loaded portion so as to reduce damping of said contact interaction.

17. The control system, according to claim 15, wherein said transmission portion is comprised of an adhesive so as to reduce damping of said contact interaction.

18. The control system, according to claim 1, further comprising:
a server in communication with said sensor, said server being comprised of a routing module, a processing module being connected to said routing module, and an output module connected to said processing module, said routing module receiving a data pattern from said control module corresponding to said data signals of said contact interaction, said processing module matching said data pattern with a gesture profile, said gesture profile being associated with a command; and
another terminal device being comprised of a receiving module and means for initiating activity of said another terminal device corresponding to said command, said another terminal device being in communication with said server, said output module transmitting said command to said receiving module.

19. The control system, according to claim 18, wherein said interactive zone of said sensor aligns with said mounting surface, said interactive zone overlaying said mounting surface, said mounting surface being on said back side of said panel, said contact interaction being on said front side of said panel, the control system further comprising:
- a wire connection between said sensor and said control module of said switch, wherein said power source of said sensor is comprised of said wire connection and said electrical connection.

20. The control system, according to claim 19, said microcontroller unit having a first power consumption level so as to be in a slack mode and a second power consumption level so as to be in an active mode,
- wherein said control module receives said data signals from said sensor and determines a mode data pattern corresponding to said data signals of said contact interaction,
- wherein said control module matches said mode data pattern with a mode gesture profile, said mode gesture profile being associated with a command to switch said control module from said slack mode to said active mode, said active mode corresponding to said control module having a second power consumption level, said second power consumption level being higher than said first power consumption level;
- wherein said another contact interaction detected by said sensor controls said another terminal device, when said control module is in said active mode, and
- wherein said control module between said slack mode and said active mode.

\* \* \* \* \*